(No Model.)
A. P. NANCE.
COTTON CULTIVATOR.
No. 248,779. Patented Oct. 25, 1881.
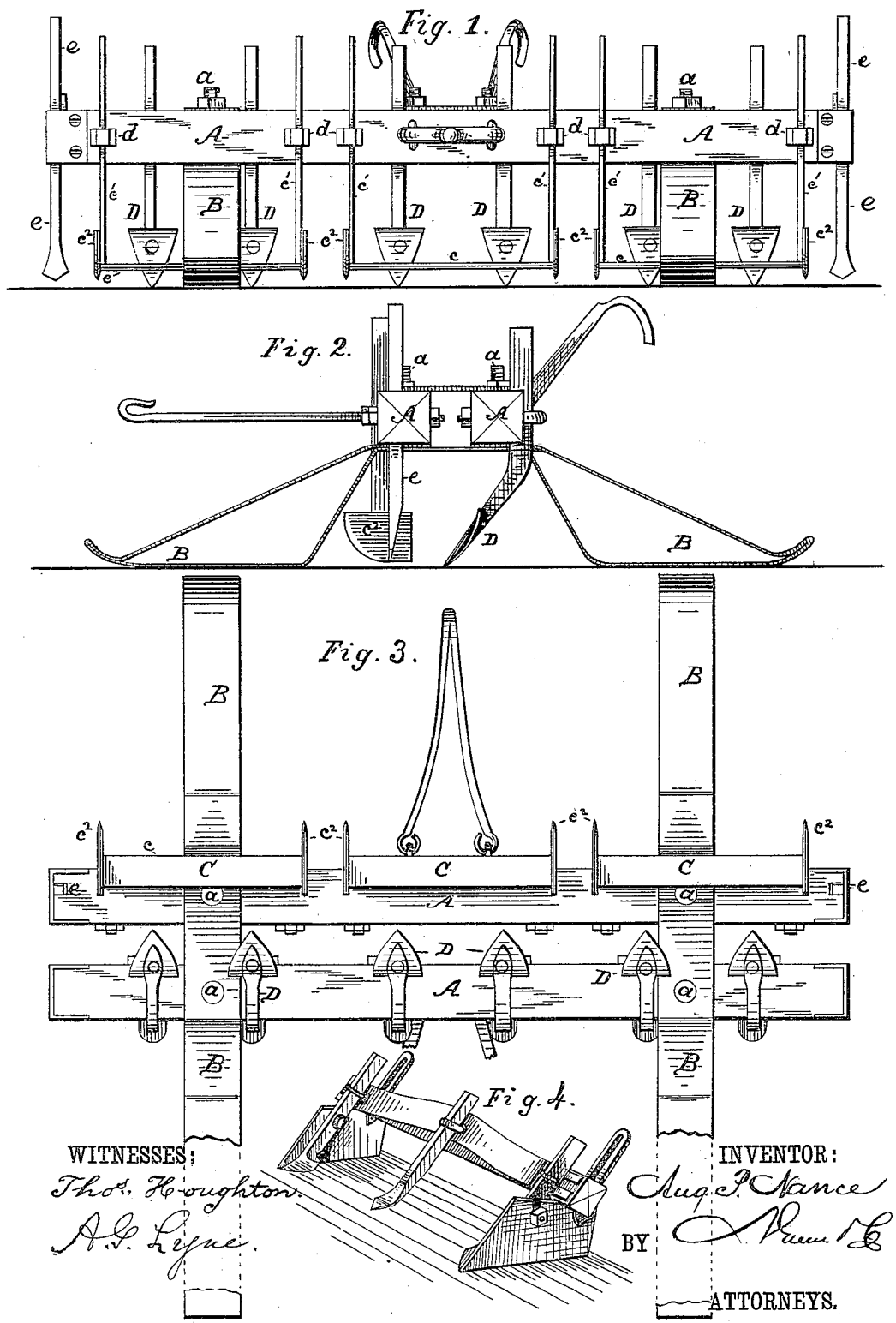
WITNESSES:
Thos. Houghton
A. L. Lyne
INVENTOR:
Aug. P. Nance
BY
ATTORNEYS.

United States Patent Office.

AUGUSTUS P. NANCE, OF BATESVILLE, ARKANSAS, ASSIGNOR OF ONE-HALF TO ANTHONY NEAL SIMMONS, OF SAME PLACE.

COTTON-CULTIVATOR.

SPECIFICATION forming part of Letters Patent No. 248,779, dated October 25, 1881.

Application filed July 19, 1881. (No model.)

*To all whom it may concern:*

Be it known that I, AUGUSTUS POPE NANCE, of Batesville, in the county of Independence and State of Arkansas, have invented a new and useful Improvement in Cotton-Cultivators, of which the following is a full, clear, and exact description, reference being had to the drawings hereto annexed.

The object of my invention is to provide a cultivator by which several rows or drills of cotton may be cultivated at a time, whereby unnecessary expense of time and labor may be saved; and the invention consists in a combination of plows and knives, as more particularly hereinafter described.

In the accompanying drawings, forming part of this specification, Figure 1 is a front elevation; Fig. 2, a side elevation; Fig. 3, a plan view of the device when inverted, and Fig. 4 a modification.

The invention consists in two parallel horizontal beams, A A, supported upon two double runners, B B, arranged near their ends, and a series of knives, C, and plows D, which are adjustably secured to the two beams, respectively. The beams A, which for general use will be about forty-four inches in length, are secured to the tops of the runners B by bolts $a$, and connected with each other by clips, through which the said bolts are made to pass. The runners B are so constructed that they will rest upon the ground only at their forward and rear ends, the intervening space being occupied by the knives and plows.

The knives C consist of horizontal blades, $c$, having an upright, $c'$, at each end, and vertical runner-shaped blades $c^2$ at the lower ends of said uprights, which are secured on the outer side thereof in such manner that they shall project slightly below the blades $c$. The uprights $c'$ are secured in suitable recesses in the forward edge of the front beam by means of hook-shaped bolts $d$, whose hooked ends are embedded in the front edge of the beam and held in such position by nuts. These knives C are placed sufficiently apart to allow space between them for the row of cotton-plants, their object being to remove all vegetation growing between said rows.

At the rear of each knife C are two plows, D, which are secured in like manner to the rear edge of the hindmost beam. These plows also are made vertically adjustable, in order that the ground may be cultivated at any desired depth. At each end of the forward beam is a vertically-adjustable guide, $e$.

It is designed that the knives C shall be removed at will and suitable harrows substituted in their place. It is also designed that this cultivator shall be made with any desired number of knives and of any convenient size, and that it shall be supported upon rollers or wheels as well as runners.

In Fig. 4 a modification is shown, in which are harrow-teeth having vertical knives attached thereto, and which are designed to be substituted for the knives above described.

I am aware that runners have before been used on cultivators, and that it is common in cotton-choppers to arrange vertical cutter-bars in pairs and connect them by means of horizontal knives. I therefore limit my invention to the specific construction herein shown and described.

Having thus described my invention, what I claim as new, and desire to secure by Letters Patent, is—

In a cotton-cultivator, the combination of beams A A, double runners B B, knives C, having horizontal blades $c$, vertical runner-shaped blades $c^2$ at each end thereof, and uprights $c'$ and plows D, substantially as shown and described, and for the purpose set forth.

AUGUSTUS POPE NANCE.

Witnesses:
EARL W. CLAPP,
W. B. LAWRENCE.